United States Patent
Hadizad et al.

(10) Patent No.: US 8,525,664 B2
(45) Date of Patent: Sep. 3, 2013

(54) SYSTEM AND METHOD FOR MINIMIZING THE AMOUNT OF DATA BEING SENT ON A NETWORK FOR SUPERVISED SECURITY SYSTEMS

(75) Inventors: Salmaan Hadizad, Richmond Hill (CA); Jitendra Patel, Mississauga (CA); Stephan Frenette, Montreal (CA)

(73) Assignee: Tyco Safety Products Canada Ltd, Concord, Ontario (CA)

( * ) Notice: Subject to any disclaimer, the term of this patent is extended or adjusted under 35 U.S.C. 154(b) by 885 days.

(21) Appl. No.: 12/534,355

(22) Filed: Aug. 3, 2009

(65) Prior Publication Data

US 2011/0026568 A1 Feb. 3, 2011

(51) Int. Cl.
G08B 26/00 (2006.01)
G08B 29/00 (2006.01)
H04Q 1/30 (2006.01)

(52) U.S. Cl.
USPC ............ 340/507; 340/505; 340/506; 340/531

(58) Field of Classification Search
None
See application file for complete search history.

(56) References Cited

U.S. PATENT DOCUMENTS

| | | | |
|---|---|---|---|
| 6,624,750 B1 * | 9/2003 | Marman et al. | 340/506 |
| 7,483,402 B2 | 1/2009 | Sturrock et al. | |
| 7,561,038 B2 | 7/2009 | Johan et al. | |
| 7,929,422 B2 * | 4/2011 | Ramalho et al. | 370/219 |
| 8,126,511 B2 * | 2/2012 | Matsuoka et al. | 455/561 |
| 2002/0016674 A1 * | 2/2002 | Rudow et al. | 701/215 |
| 2004/0064542 A1 * | 4/2004 | Williams | 709/224 |
| 2007/0058599 A1 * | 3/2007 | Harsch | 370/338 |
| 2007/0274309 A1 * | 11/2007 | Donaghey | 370/389 |
| 2008/0025487 A1 * | 1/2008 | Johan et al. | 379/106.01 |
| 2008/0109470 A1 | 5/2008 | McGee | |
| 2009/0017810 A1 * | 1/2009 | Harsch | 455/418 |
| 2010/0295674 A1 * | 11/2010 | Hsieh et al. | 340/539.12 |

OTHER PUBLICATIONS

International Searching Authority, International Search Report and Written Opinion dated Nov. 19, 2010 for International Application No. PCT/CA2010/001192, International Filing Date Jul. 29, 2010 (8 pages).

* cited by examiner

*Primary Examiner* — Gregory J Toatley
*Assistant Examiner* — Juan D Valentin, II
(74) *Attorney, Agent, or Firm* — Kacvinsky Daisak pllc

(57) ABSTRACT

A system and method are disclosed for communicating heartbeat signals representative of the condition of a security system to a monitoring station. A controller is provided that transmits a heartbeat signal to a monitoring station within a given time period and awaits an acknowledgement signal from the monitoring station. If an acknowledgement signal is received within a time interval from the transmission of the heartbeat signal, then the time period is reset and another heartbeat signal is not sent until the next time period. If an acknowledgement signal is not received by the controller within a few seconds of transmitting the heartbeat signal, then another heartbeat signal is sent from the controller to the monitoring station. Heartbeat signals are only transmitted from the controller if an acknowledgement signal is not received from the monitoring station. In this manner, the amount of data sent over a communication link is reduced.

18 Claims, 3 Drawing Sheets

SYSTEM AND METHOD FOR MINIMIZING THE AMOUNT OF DATA BEING SENT ON A NETWORK FOR SUPERVISED SECURITY SYSTEMS

BACKGROUND OF THE INVENTION

1. Field of the Invention

Embodiments of the invention relate to the field of security alarm systems. More particularly, the present invention relates to an apparatus and method for communication between a security alarm system and a remote monitoring station using reduced data transmission.

2. Discussion of Related Art

Home and business alarms (often referred to as "security systems" or "alarm systems") typically include several sensors used to monitor unauthorized entry and other conditions at monitored premises, such as fire, smoke, toxic gases, high/low temperature (e.g. freezing) or flooding. These sensors communicate, either wired or wirelessly, with an alarm panel. In response to sensing an alarm condition, a sensor provides a signal to the alarm panel that in turn may sound and notify the occurrence of the alarm to occupants of the premises and remotely signal a monitoring or central station, law enforcement or fire department services. Typically the occurrence of an alarm is signaled to a remote monitoring station that may then dispatch capable authorities to intervene at the premises. For example, in the case of sensing an unauthorized entry to the premises, the monitoring station may dispatch security personnel, typically in the form of private security guards or police officers. Such communication between the premises and the monitoring station has typically taken place by way of the public switched telephone network (PSTN). However, with the advent of other communication networks such as, for example, wireless (GSM/GPRS) and/or Ethernet/Internet, more modern alarm systems utilize these other facilities either in addition to or in place of the PSTN.

Alarm systems communicate with the central monitoring station to confirm that the system is "on-line." In particular, a "heartbeat" (also referred to as a poll) signal is periodically sent between a communicator housed within the controller and the central monitoring station. This heartbeat may be sent by the central monitoring station or by the communicators at regular intervals. For example, a common UL requirement is for the system to confirm that the communicator or controller is capable of transmitting alarms to the central monitoring station every 200 seconds. However, sending just one heartbeat signal may provide a false indication that the system is off-line since packets sent over GSM and IP networks may be lost.

To overcome this drawback, the communicator may be configured to send several heartbeats within a certain number of seconds to ensure that the receiver at the central monitoring station receives at least one of these heartbeat signals within the given time period. For example, if the requirement is to verify on-line status of an alarm system every 200 seconds, the communicator transmits a heartbeat signal every sixty (60) seconds so that three (3) heartbeat signals are transmitted to the central monitoring station during the given interval. Each of these heartbeat signals includes a certain number of bytes sufficient for the central monitoring station can identify the security system from which the heartbeat transmission originated along with some additional information regarding the system. In addition, the communicator may be configured to communicate with the receiver at the central monitoring station indicating when to expect the next heartbeat signal. However, use of wireless and internet communications to send these heartbeat signals is costly. In particular, these network operators often levy charges depending on whether a data or voice call is placed and how much data is being transferred. Therefore, by sending heartbeat signals at set intervals within a given time interval regardless of whether or not an acknowledgement signal is received from the monitoring station requires the transmission of unnecessary data. Thus, there is a need to provide a communication method that reduces the amount of data being transferred between a communicator or controller of a security alarm system and a central monitoring station while still ensuring on-line notification transmissions consistent with UL requirements.

SUMMARY OF THE INVENTION

Exemplary embodiments of the present invention are directed to an apparatus and method for an electronic security system. In an exemplary embodiment a method for limiting the amount of data transmitted between a security system and a monitoring station within a time period includes transmitting a heartbeat signal from a controller within a security system to the monitoring station and waiting for an acknowledgement signal to be sent from the central station to the controller. A determination is made as to whether or not an acknowledgement signal was received by the controller in response to the heartbeat signal. If an acknowledgement signal is received by the controller in response to the heartbeat signal, then the time period to transmit a subsequent heartbeat signal from the controller to the central station is reset.

In another exemplary embodiment, a system for transmitting heartbeat signals for use with a system in a monitored building includes a plurality of sensors, and a controller communicating with each of the plurality of sensors, a receiver at a monitoring station communicating with the controller, and a machine-readable storage medium encoded with a computer program code in the controller such that, when the computer program code is executed by a processor, the processor performs a method comprising transmitting a heartbeat signal from a controller within a security system to the monitoring station and waiting for an acknowledgement signal to be sent from the monitoring station to the controller. A determination is made as to whether or not an acknowledgement signal was received by the controller in response to the heartbeat signal. If an acknowledgement signal is received by the controller in response to the heartbeat signal, then the time period to transmit a subsequent heartbeat signal from the controller to the monitoring station is reset.

DESCRIPTION OF EMBODIMENTS

Figure 1:
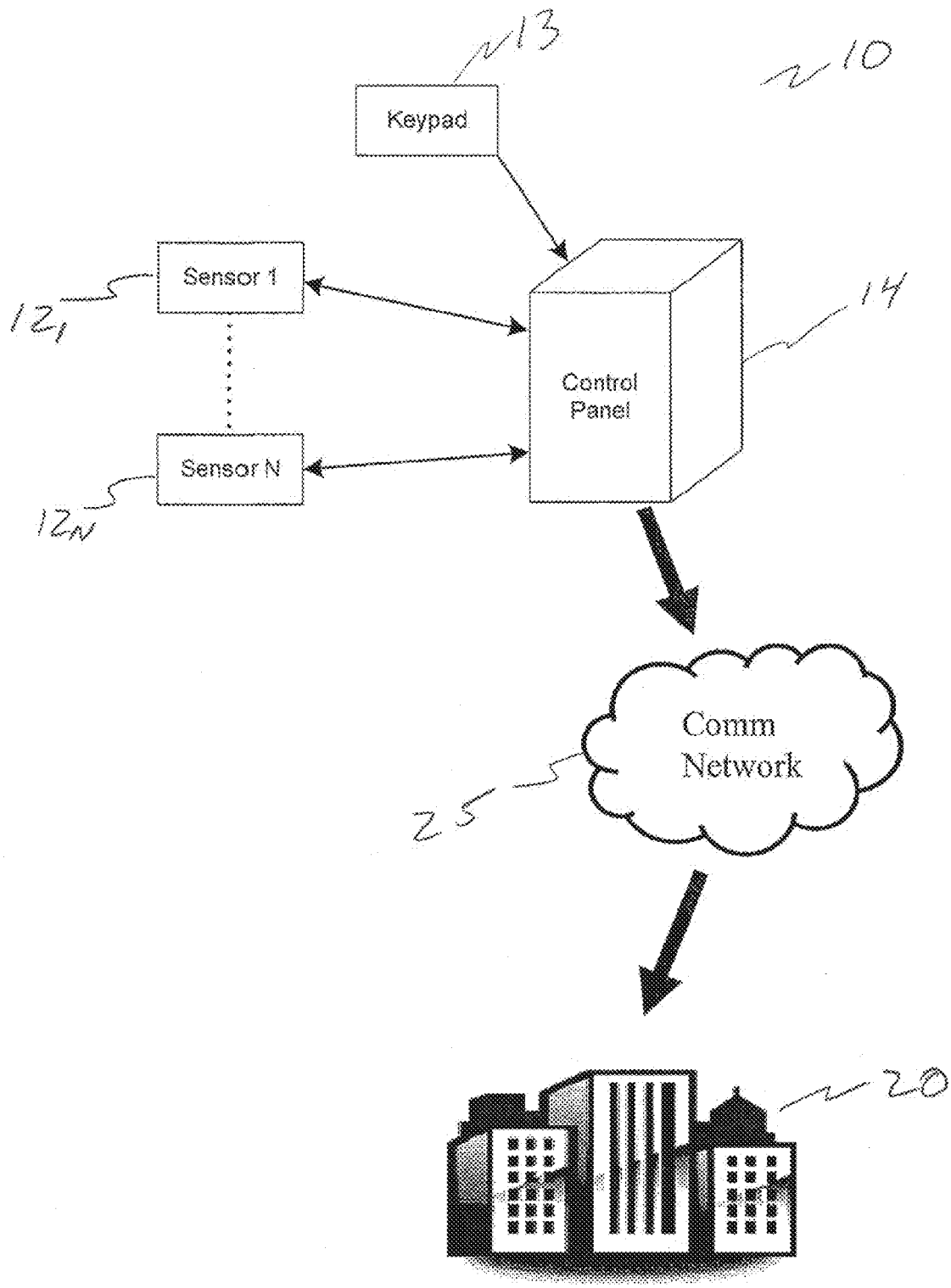
FIG. 1 is a schematic diagram a security system in accordance with an aspect of the present invention.

The present invention will now be described more fully hereinafter with reference to the accompanying drawings, in which preferred embodiments of the invention are shown.

This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

FIG. 1 is a block diagram of an exemplary security system 10 for a commercial or residential building that includes a plurality of two-way sensor devices $12_1 \ldots 12_N$ positioned throughout the building or a portion of the building, and a system control panel/controller 14 configured to receive signals from the devices $12_1 \ldots 12_N$. A non-limiting exemplary list of such two-way devices $12_1 \ldots 12_N$ includes, heat, smoke, fire and toxic gas detectors, fire alarms, security alarms, emergency lighting, strobe lighting, door contact detectors, motion detectors, sirens, and the like. One or more keypad(s) 13 communicate with controller 14 to input command signals and/or as a message or notification device of system 10. The devices $12_1 \ldots 12_N$ and/or keypad(s) 13 may be wired to controller 14 and/or may be two-way wireless devices. If wireless, the devices $12_1 \ldots 12_N$ and keypad(s) 13 are be capable of sending wireless signals to the system controller 14 indicative of one or more alarm, status and/or communication conditions. The two-way devices $12_1 \ldots 12_N$ are configured to transmit a signal representative of the status of the devices (e.g., alarm condition or other status). The devices $12_1 \ldots 12_N$ may also be configured to transmit an identification signal that enables the system controller 14 to recognize the particular device, or the type of device (e.g., door contact, motion detector). In one embodiment, the identification signal represents a unique serial number or other unique identifier associated with the particular device $12_1 \ldots 12_N$ and/or keypad(s) 13.

Controller 14 communicates with a central monitoring station 20 via a communications network 25. Central monitoring station 20 may be a single monitoring station or may be formed from a plurality of monitoring stations each at different physical locations. Communications network 25 may be a PSTN (Public Switched Telephone Network), a cellular network such as, for example, a GSM (Global System for Mobile Communications) network for SMS and packet voice communication, General Packet Radio Service (GPRS) network for packet data and voice communication, or a wired data network such as, for example, Ethernet/Internet for tcp/ip, voip communication, etc.

In the event that a device $12_1 \ldots 12_N$ is triggered or a command is entered via keypad(s) 13, the controller 14 receives the signal from one or more of the devices $12_1 \ldots 12_N$, and/or a user input command from keypad 13, processes these signals and sends an appropriate command to the central monitoring station 20 via communicator 17 using one or more networks 25. Alternatively, the controller 14 may first communicate with an intermediary station before proceeding to the central monitoring station 20. This may be the case, for example, with communication over a GSM network where the signal is first sent to a clearing house which translates the message before sending it to a central monitoring station 20.

Figure 2A:
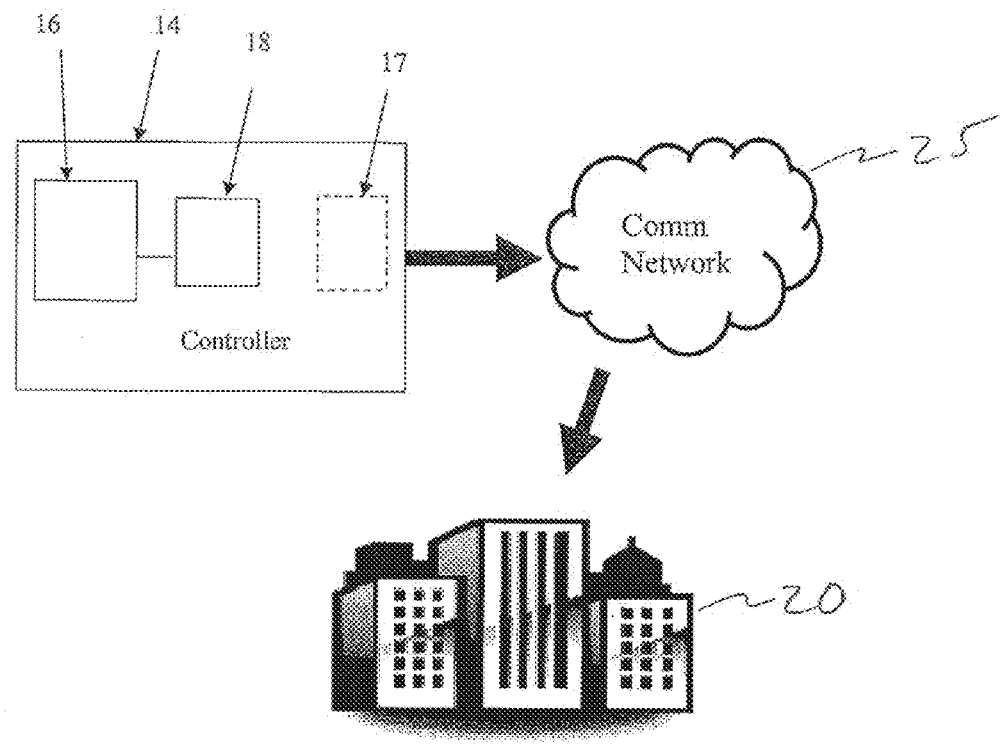
FIG. 2A is a schematic diagram of an exemplary controller of the system of FIG. 1 in accordance with an aspect of the present invention.

FIG. 2A illustrates a block diagram of controller 14 including a processor 16 and local memory 18 (e.g., a buffer) for storing a variety of information relating to system 10, the two-way devices $12_1 \ldots 12_N$ and keypad(s) 13. For example, controller 14 may have separate zones for different devices being monitored. In one embodiment, a first zone is used for a front entry door contact, a second zone is used for a patio door contact, a third zone is used for a motion detector and a fourth zone is used for a smoke detector, etc. The controller 14 may be in communication with a central monitoring facility 20 via communicator 17 using communication link 25. The central monitoring facility 20 monitors the status of the security system 10 and initiates appropriate action (e.g., alert building personnel, alert appropriate local authorities) when an alarm condition exists as indicated by one or more of the devices $12_1 \ldots 12_N$ and/or keypad 13. Controller 14 may include a communicator 17 which controls the communication to a receiver located at the central monitoring station 20.

Communicator 17 is shown as dashed lines because it may be contained within the controller 14 or may be separate therefrom. Communicator 17 may be a dual communicator which transmits signals via GSM and/or Ethernet connections. In addition, communicator 17 may be a primary communications interface for system 10 or may be a back-up interface in addition to a primary PSTN network. Alternatively, GSM may be the primary communication facility and Ethernet as the secondary and vice versa. The use of a GSM or Ethernet/Internet communication network may be more preferable to a PSTN connection since the GSM/Ethernet facility is always communicating with central station 20, whereas a PSTN connection only communicates with central station 20 when control panel 14 initiates a call.

Typically the central monitoring facility 20 is geographically remote from the building or buildings being monitored, and in practical application the central monitoring facility 20 will often simultaneously monitor a plurality of different buildings or premises. A "heartbeat" signal is transmitted between controller 14 and the central monitoring station 20 via a communication network 25 using communicator 17 at regular intervals to ensure that the system 10 is on-line and operational. Controller 14 waits for an acknowledgement signal from central monitoring station 20. An acknowledgement signal is sent from the central monitoring station 20 to the controller 14 upon successful receipt of the heartbeat signal. Once the heartbeat signal is received by the controller 14, the time interval begins again. However, the heartbeat signal is not sent at set intervals within the heartbeat time interval as previously performed. Rather, the heartbeat signal is sent toward the end of the time interval and awaits the acknowledgement from the central station. In this manner, multiple heartbeat signals comprising data are not sent automatically thereby conserving the amount of data sent over communication network 25 and associated costs.

This conservation of data transmission may be significant since data transmitted back and forth between system 10 and central station 20 may number in the hundreds of thousands. If the acknowledgement signal is not received by central monitoring station 20, then controller 14 waits a few seconds and sends another heartbeat signal and awaits a response. This process continues until an acknowledgement signal is received. If an acknowledgement signal is not received by the end of the time interval plus a predetermined time (in seconds), then controller 14 sends an alert or alarm notification signal to central monitoring station 20. The central monitoring station may also generate a local alarm if the heartbeat is not received within a pre-determined time period. In addition, communicator 17 may be programmed to transmit heartbeat signals to multiple central stations in the event that an acknowledgement signal is not received. Moreover, communicator 17 may be programmed to transmit a first heartbeat signal to a first central station over a first communication network (e.g. GSM). Depending on whether or not an acknowledgement signal is received, communicator 17 may be programmed to transmit a second heartbeat signal to the first central station over a second communication network (e.g. Ethernet/Internet). Alternatively, communicator 17 may be programmed to transmit a second heartbeat signal to a second central station over a second communication network (e.g. Ethernet/Internet). This programming feature may take advantage of heartbeat transmissions over alternative communications networks and multiple central stations depending on whether or not an acknowledgement signal is received by the controller.

Figure 2B:
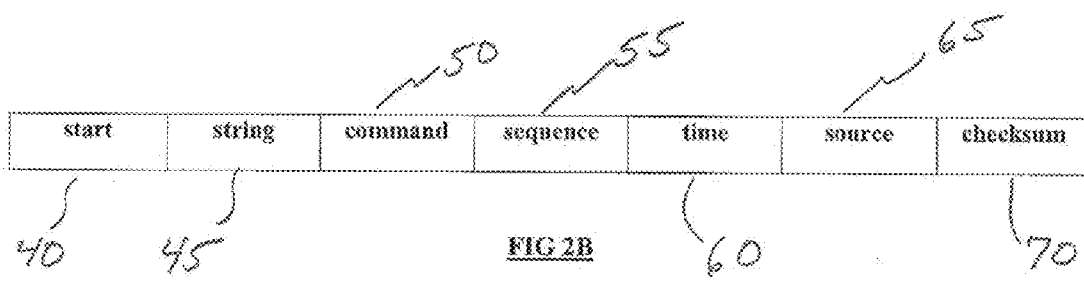
FIG. 2B is an exemplary format of a heartbeat message sent between the controller and the central monitoring station in accordance with an aspect of the present invention.

The heartbeat signal may be sent by the controller 14 to the central monitoring station or in the case of communication via a GSM network, to a clearing house before being translated and sent to a central monitoring station. As described above in the case where controller 14 sends heartbeat signals to the central monitoring station, the sending of one heartbeat signal during the specified interval was not recommended over wireless and IP networks considering the frequency of lost packet data during transmission. FIG. 2B is a structure of an exemplary heartbeat signal packet including a start byte 40, string length 45, command 50, sequence number 55, time 60, source 65 and checksum 70. Of course, the content and frequency of the heartbeat signal will depend on the type of communication network employed for transmission thereof as well as the type and use of security system 10. For example, there are essentially two (2) types of commonly used heartbeat signals for commercial and residential applications. A first heartbeat signal, typically used in commercial applications, uses more data (e.g. 101 bytes) and can detect the absence of a unit within a security system 10 and supports swap detection. The acknowledgement signal for this type of heartbeat signal uses a smaller data packet than the heartbeat signal (e.g. 74 bytes). A second type of heartbeat signal, typically used for residential applications, uses less data (e.g. 60 bytes) than the commercial heartbeat signal and detects the absence of a unit within the system 10, but does not support swap detection. The acknowledgement signal from the monitoring station uses about the same size data packet as this second type heartbeat signal. In addition, the heartbeat signal used in commercial alarm systems is usually sent more frequently than the heartbeat signal used in residential applications.

Figure 3:
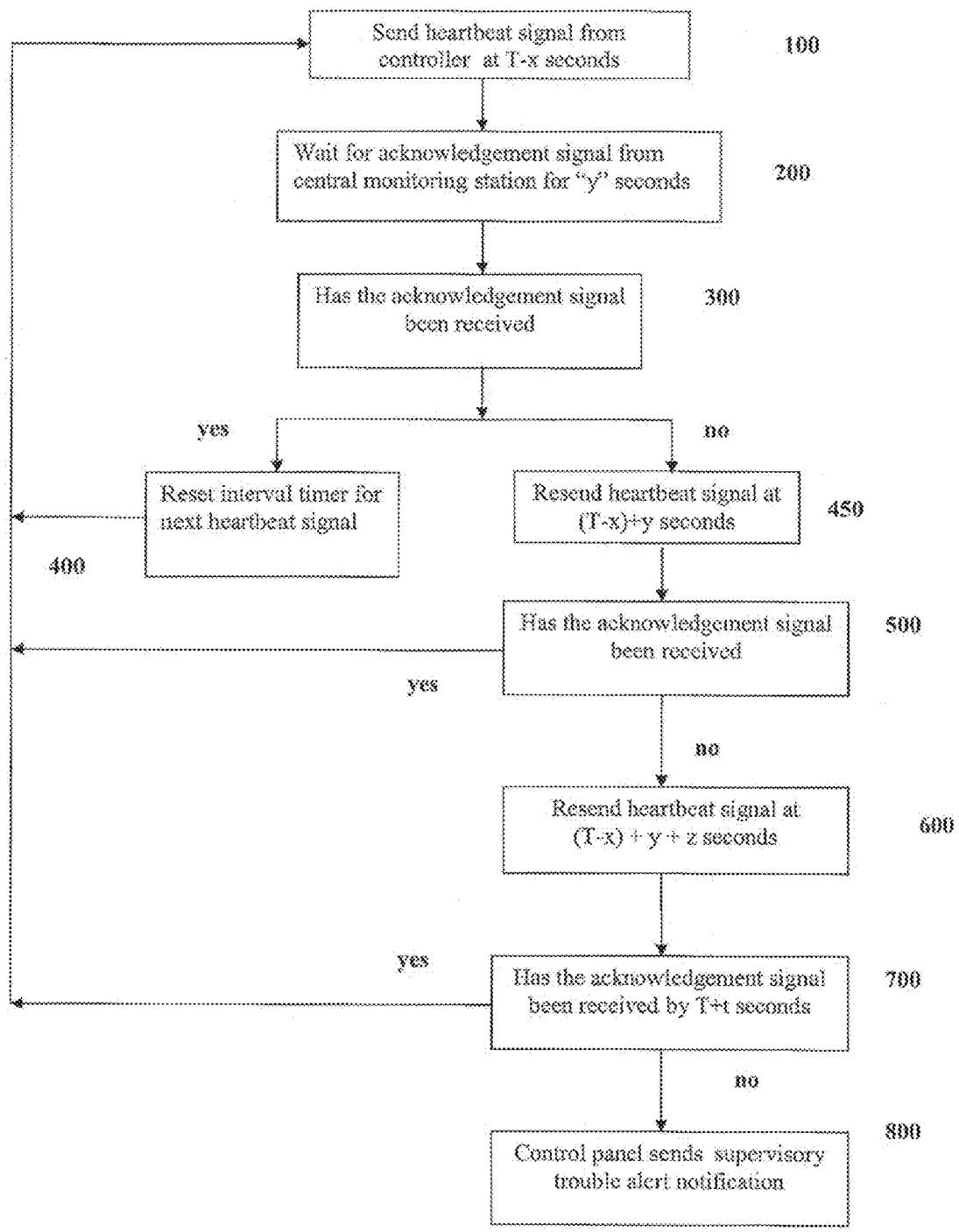
FIG. 3 is a flowchart describing an exemplary method of operating the system of FIG. 1 in accordance with an aspect of the present invention.

FIG. 3 is a flow chart illustrating the process of communicating heartbeat and acknowledgement signals between controller 14 and central monitoring station 20 using either an Ethernet or GPRS communication link as executed by processor 16 and memory 18. At step 100, controller 14 sends a heartbeat signal at T−x seconds where T is the predetermined heartbeat time interval and x is a number of seconds prior to the termination of T. For example, if heartbeat time interval T is 200 seconds, controller 14 sends a first heartbeat signal at 135 seconds where x is 65 seconds (i.e. 200 seconds−65 seconds). The controller waits for an acknowledgement signal from the central station at step 200 for "y" seconds. A determination is made at step 300 whether or not an acknowledgement signal has been received by controller 14. If an acknowledgement signal has been received, then the heartbeat time interval T is reset for the next heartbeat signal at step 400 and the process begins again at step 100. If an acknowledgment signal is not received from the central monitoring station 20, then the controller 14, at step 450, sends another heartbeat signal at time (T−x)+y where y is a number of seconds after the first heartbeat was sent. For example, if T=200 then the first heartbeat is sent x seconds (e.g. 65 seconds) prior to the end of the heartbeat time interval T which is 135 seconds (200−65) and the second heartbeat is sent a few seconds (e.g. y is 5 seconds) after the first (e.g. at 140 seconds). A determination is made at step 500 whether or not an acknowledgement signal has been received by controller 14 after the second heartbeat signal. If an acknowledgement signal has been received, then the time interval is reset for the next heartbeat signal at step 100. If an acknowledgement signal is not received from central monitoring station 20, then another heartbeat signal is sent, at step 600, by controller 14 at (T−x)+y+z seconds which is z seconds after the second heartbeat signal was sent. Continuing with the example, if the second heartbeat signal was sent at 140 seconds, then the third heartbeat signal is sent at 145 seconds (e.g z is 5 seconds) (i.e. (200−65+5+5).

This process continues until a determination is made at step 700 whether or not an acknowledgement signal has been received by controller 14 prior to time T+t where t is a specified number of seconds after the time interval such as, for example, 65 seconds. If an acknowledgment signal was received by T+t seconds, then the process starts again at step 100. If no acknowledgement signal is received by T+t, then control panel 14 sends a supervisory alert notification to central monitoring station 20 at step 800. Thus, controller 14 transmits a subsequent heartbeat signal only after a previous heartbeat signal was transmitted and an acknowledgement signal was not received from the central monitoring station. In this manner, the number of heartbeat signals sent during a given time interval T is dependent on the receipt or non-receipt of an acknowledgement signal from the central monitoring station, thereby limiting the amount of data sent between the controller and central station.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A method for limiting the amount of data transmitted between a security system and a monitoring station within a heartbeat time interval comprising:
    transmitting a first heartbeat signal from a controller within a security system to the monitoring station;
    waiting a given time period for an acknowledgement signal to be sent from the monitoring station to the controller;
    determining whether or not an acknowledgement signal was received by the controller in response to the first heartbeat signal within the given time period;
    if an acknowledgement signal is received by the controller in response to the first heartbeat signal within the given time period, then resetting the heartbeat time interval to transmit a subsequent heartbeat signal from the controller to the monitoring station; and
    transmitting a second heartbeat signal from the controller to the monitoring station within the heartbeat time interval if an acknowledgement signal is not received by the controller within the given time period from when the first heartbeat signal was transmitted to the monitoring station;
    wherein the first heartbeat signal is transmitted from the controller to the monitoring station over a first communication network and the second heartbeat signal is transmitted from the controller to the monitoring station over a second communication network that is different from the first communication network.

2. The method of claim 1 further comprising:
    determining whether or not an acknowledgement signal was received by the controller in response to the second heartbeat signal; and if an acknowledgement signal is received by the controller in response to the second heartbeat signal, then resetting the heartbeat time interval to transmit a subsequent heartbeat signal from the controller to the monitoring station.

3. The method of claim 2 further comprising:
transmitting a third heartbeat signal from the controller to the monitoring station if an acknowledgement signal is not received by the controller within a given time period from when the second heartbeat signal was transmitted to the monitoring station;
determining whether or not an acknowledgement signal was received by the controller in response to the third heartbeat signal; and
if an acknowledgement signal is received by the controller in response to the third heartbeat signal; then resetting the heartbeat time interval to transmit a subsequent heartbeat signal from the controller to the monitoring station.

4. The method of claim 2 wherein said heartbeat time interval is T and said given time period is represented by "x" seconds, said first heartbeat signal is transmitted from the controller at T−x seconds.

5. The method of claim 2 wherein the time period for waiting for an acknowledgement signal after the first heartbeat signal is transmitted is represented by "y" seconds, said second heartbeat signal is transmitted from the controller at (T−x)+y seconds.

6. The method of claim 2 further comprising transmitting an alarm notification from the controller to the monitoring station if the acknowledgement signal is not received by a given time interval after expiration of the time period.

7. The method of claim 1 wherein the first heartbeat signal is a data packet containing information associated with the security system.

8. The method of claim 1 wherein the first heartbeat signal is transmitted from the controller to the monitoring station via a GPRS communication link.

9. The method of claim 1 wherein the first heartbeat signal is transmitted from the controller to the monitoring station via an internet based communication link.

10. The method of claim 1 wherein transmitting the first heartbeat signal from the controller includes transmitting the first heartbeat signal from a communicator housed within the controller.

11. A method for limiting the amount of data transmitted between a security system and a receiving station within a time period comprising:
transmitting a first heartbeat signal from a communicator within a security system to the receiving station within a heartbeat time interval;
waiting for an acknowledgement signal to be sent from the receiving station to the security system within the heartbeat time interval;
determining whether or not an acknowledgement signal was received by the security system in response to the first heartbeat signal within the heartbeat time interval;
if an acknowledgement signal is received by the security system in response to first the heartbeat signal within the heartbeat time interval, then resetting the heartbeat time interval to transmit a subsequent heartbeat signal from the communicator to the receiving station; and
transmitting a second heartbeat signal from the communicator to the receiving station within the heartbeat time interval if an acknowledgement signal is not received by the security system within the given time period from when the first heartbeat signal was transmitted to the receiving station;
wherein the first heartbeat signal is transmitted from the communicator to the receiving station over a first communication network and the second heartbeat signal is transmitted from the communicator to the receiving station over a second communication network that is different from the first communication network.

12. The method of claim 11 wherein the security system includes a plurality of sensors communicating with a controller, said communicator is housed within the controller.

13. The method of claim 11 wherein the security system includes a plurality of sensors communicating with a controller, the communicator is housed separate from the controller.

14. A system for transmitting heartbeat signals for use with a system in a monitored building comprising a plurality of sensors, and a controller communicating with each of the plurality of sensors, a receiver at a monitoring station communicating with the controller, and a machine-readable storage medium encoded with a computer program code in the controller such that, when the computer program code is executed by a processor, the processor performs a method comprising:
transmitting a first heartbeat signal from a controller within a security system to the monitoring station within a heartbeat time interval;
waiting for an acknowledgement signal to be sent from the monitoring station to the controller within the heartbeat time interval;
determining whether or not an acknowledgement signal was received by the controller in response to the first heartbeat signal within the heartbeat time interval;
if an acknowledgement signal is received by the controller in response to the first heartbeat signal, then resetting the heartbeat time interval to transmit a subsequent heartbeat signal from the controller to the monitoring station; and
transmitting a second heartbeat signal from the controller to the monitoring station within the heartbeat time interval if an acknowledgement signal is not received by the controller within the given time period from when the first heartbeat signal was transmitted to the monitoring station:
wherein the first heartbeat signal is transmitted from the controller to the monitoring station over a first communication network and the second heartbeat signal is transmitted from the controller to the monitoring station over a second communication network that is different from the first communication network.

15. The system of claim 14, wherein each of the plurality of sensors communicates with the controller and the controller is configured to receive alarm notifications from each of the plurality of sensors.

16. The system of claim 14 wherein the controller communicates with the monitoring station via a GPRS communication network.

17. The system of claim 14 wherein the first heartbeat signal is transmitted to the monitoring station via an internet based communication link.

18. The system of claim 14 wherein the first heartbeat signal is a data packet containing information associated with the security system.

* * * * *